(12) United States Patent
Cheng et al.

(10) Patent No.: US 12,525,305 B2
(45) Date of Patent: Jan. 13, 2026

(54) MEMORY DEVICE AND ENHANCE PROGRAMMING METHOD THEREOF

(71) Applicant: Winbond Electronics Corp., Taichung (TW)

(72) Inventors: Lung-Chi Cheng, Taichung (TW); Shan-Hsuan Tsai, Taichung (TW); Ying-Shan Kuo, Taichung (TW); Ngatik Cheung, San Jose, CA (US); Ju-Chieh Cheng, Taichung (TW)

(73) Assignee: Winbond Electronics Corp., Taichung (TW)

( * ) Notice: Subject to any disclaimer, the term of this patent is extended or adjusted under 35 U.S.C. 154(b) by 197 days.

(21) Appl. No.: 18/319,501

(22) Filed: May 18, 2023

(65) Prior Publication Data
US 2024/0347118 A1    Oct. 17, 2024

(30) Foreign Application Priority Data

Apr. 13, 2023   (TW) .................................. 112113845

(51) Int. Cl.
  *G11C 16/34*    (2006.01)
  *G11C 16/10*    (2006.01)
(52) U.S. Cl.
  CPC ........ *G11C 16/3459* (2013.01); *G11C 16/102* (2013.01)

(58) Field of Classification Search
  CPC .......................... G11C 16/3459; G11C 16/102
  See application file for complete search history.

(56) References Cited

U.S. PATENT DOCUMENTS

| 7,692,970 | B2 | 4/2010 | Park et al. | |
| 8,767,475 | B2* | 7/2014 | Cho ....................... | G11C 16/10 365/185.18 |
| 11,238,947 | B2* | 2/2022 | Lee ..................... | G11C 16/3459 |
| 11,520,489 | B2* | 12/2022 | Yoo ......................... | G06F 3/064 |
| 2022/0189557 | A1 | 6/2022 | Kim et al. | |

FOREIGN PATENT DOCUMENTS

EP            1971984        3/2011

* cited by examiner

*Primary Examiner* — Vanthu T Nguyen
(74) *Attorney, Agent, or Firm* — JCIPRNET

(57) ABSTRACT

A memory device and an enhance programming method thereof are provided. The enhance programming method includes: performing program and verifying operations on a plurality of memory cell groups of a memory division, where each of the memory cell group corresponds to at least one byte; calculating a programming time for completing program operation of each of the memory cell groups; setting an indication flag when the programming time is larger than a preset threshold value; and, when the indication flag is in a setting state, increasing at least one of a plurality of program operation parameters, and performing an enhancement programming operation on the memory cell groups of the memory division.

14 Claims, 3 Drawing Sheets

MEMORY DEVICE AND ENHANCE PROGRAMMING METHOD THEREOF

CROSS-REFERENCE TO RELATED APPLICATION

This application claims the priority benefit of Taiwan application serial no. 112113845, filed on Apr. 13, 2023. The entirety of each of the above-mentioned patent applications is hereby incorporated by reference herein and made a part of this specification.

BACKGROUND

Technical Field

The invention relates to a memory device and an enhance programming method thereof, and in particular, to a memory device and an enhance programming method thereof that can improve data reliability.

Description of Related Art

The lifetime cycle of non-volatile memory will be accelerated and shortened under conditions of long time, temperature, and voltage stress, which will affect the reliability of the components. Among them, as the memory cells are repeatedly written and erased, there will be a large number of traps in the oxide layer of the memory cells. These traps in the oxide layer of the memory cells are prone to interference due to programming actions or relaxation effects, causing trapped charges to escape from the oxide layer, thereby reducing the critical voltage of the memory cells and affecting the window size of data as logic 0.

SUMMARY

The invention provides a memory device and an enhance programming method thereof that can effectively improve the reliability of stored data.

The enhance programming method of the present invention includes: performing program and verifying operations on a plurality of memory cell groups of a memory division, where each of the memory cell group corresponds to at least one byte; calculating a programming time for completing program operation of each of the memory cell groups; setting an indication flag when the programming time is larger than a preset threshold value; and, when the indication flag is in a setting state, increasing at least one of a plurality of program operation parameters, and performing an enhancement programming operation on the memory cell groups of the memory division.

The memory device includes a memory array and a controller. The memory array has at least one memory division. The controller is coupled to the at least one memory division. The controller is configured to: performing program and verifying operations on a plurality of memory cell groups of a memory division, where each of the memory cell group corresponds to at least one byte; calculating a programming time for completing program operation of each of the memory cell groups; setting an indication flag when the programming time is larger than a preset threshold value; and, when the indication flag is in a setting state, increasing at least one of a plurality of program operation parameters, and performing an enhancement programming operation on the memory cell groups of the memory division.

Based on above, the memory device of the present invention calculates the programming times of the program operation of each memory cell group in the memory division. And when the programming time is greater than the preset threshold value, an enhancement programming operation is additionally performed on the memory cell group of the memory division to ensure the reliability of the saved data.

DESCRIPTION OF THE EMBODIMENTS

Figure 1:
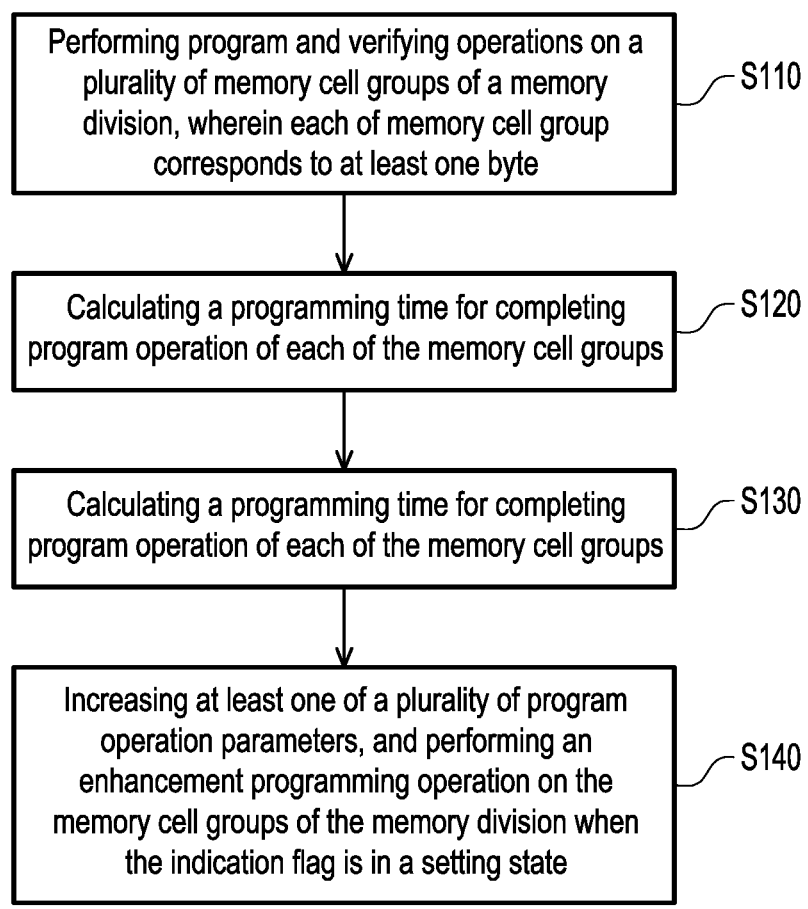
FIG. 1 is a flow chart of an enhance programming method of a memory device according to an embodiment of the present invention.

Referring to FIG. 1, FIG. 1 is a flow chart of an enhance programming method of a memory device according to an embodiment of the present invention. In the embodiment, the memory device includes a plurality of memory division, and each memory division includes a plurality of memory cell groups. Among them, each memory cell group can store one or more bytes. In step S110, the memory device can perform program and verifying operations on the plurality of memory cell groups in each memory divisions. In step S120, during the process of executing the program and verifying operation for each memory cell group, the memory device can count the programming time required for each memory cell group to complete the program operation. In step S130, corresponding to each memory cell group, the memory device can compare the programming time required to complete the program operation with a preset threshold value to determine whether each memory cell group has degraded memory cells. Herein, when the memory device determines that the programming time required for the memory cell group to complete the program operation is greater than the preset threshold value, the memory device can determine that the corresponding memory cell group has degraded memory cells; in contrast, when the memory device determines that the programming time required for the memory cell group to complete the program operation is not greater than the preset threshold value, the memory device can determine that the corresponding memory cell group does not have degraded memory cells. Furthermore, in step S130, when the memory device determines that the corresponding memory cell group has degraded memory cells, that is, when the programming time required by the memory cell group to complete the program operation is greater than the preset threshold value, the memory device can perform a setting operation for the indication flag (for example, set the indication flag to logic 1).

In step S140, when the program operation of the memory cell group of all addresses in the memory division has been completed, the memory device can determine the state of the indication flag. And when the indication flag is in a setting state (for example, logic 1), the memory device can enhance at least one of a plurality of program operation parameter and perform an enhancement programming operation on the memory cell group of the memory division.

In the embodiment, in the enhancement programming operation, the multiple program operation parameters enhanced by the memory device include, for example, programmed verification voltage, a voltage value of a programmed pulse, and a width of the programmed pulse. Among them, in the embodiment of the present invention, the memory device can increase one or more of the above-mentioned multiple program operation parameters.

In the embodiment of the present invention, In the embodiment of the present invention, the memory device can determine whether an additional enhancement programming operation needs to be performed on the memory cell group through real-time detection. In this way, the charge amount of a small number of degraded memory cells in the memory cell group is compensated to maintain the accuracy of the data.

Also, the memory device of the embodiment of the present invention can perform adaptive enhancement programming operation only for the memory cell groups that are degraded and does not need to perform the charge re-refresh operation for all the memory cell groups, effectively saving additional writing time.

It is worth mentioning that, in the embodiment, the memory device can be a non-volatile memory device, such as flash memory. The memory division can be a memory page or a memory block of any size, without specific limitations. The memory cell group can store any number of bytes is 2 to the Nth power of bytes, such as 1, 2, 4, 8, etc., where N can be any non-negative integer, without specific limitations.

Figure 2:
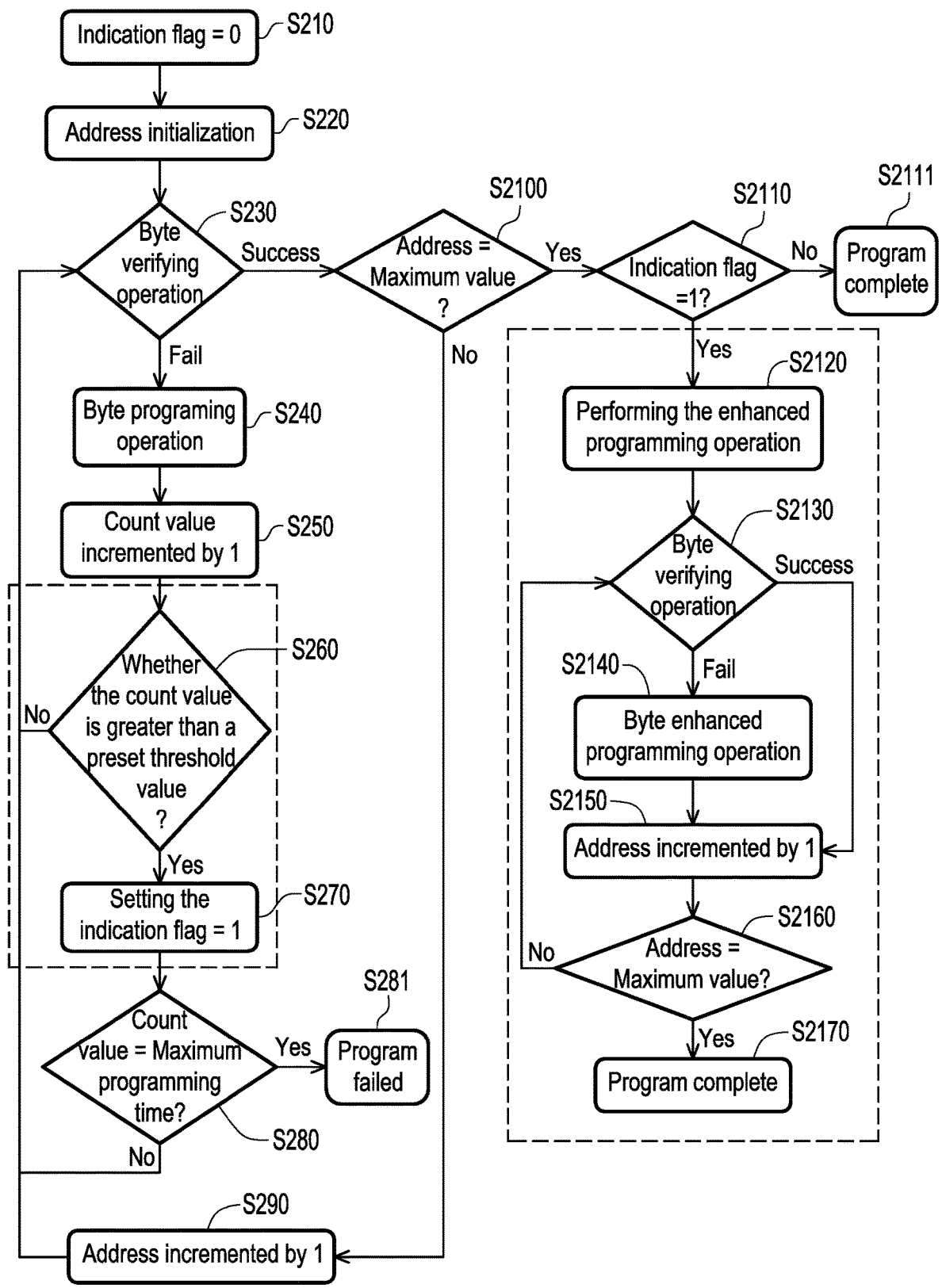
FIG. 2 is a flow chart of an enhance programming method of the memory device according to another embodiment of the present invention.

Referring to FIG. 2 below, FIG. 2 is a flow chart of an enhance programming method of the memory device according to another embodiment of the present invention. In step S210, the memory device clears the indication flag to logic 0, and in step S220, initializes the address of the memory division, and makes the address point to an initial value. In step S230, a first program and verifying operation can be performed on the first memory cell group corresponding to the address of the initial value. If the program and verifying operation indicates that the verification is passed, step S2100 can be performed. Relatively, if the program and verifying operation in step S230 indicates that the verification is failed, step S240 may be executed.

In step S2100, it is possible to determine whether the current address is the maximum value, that is, whether the current memory cell group being processed is the last one. If the current address is the maximum value, then step S2110 is executed. Conversely, if the current address is not the maximum value, then step S290 is executed to increment the address by 1, and the program and verifying operation can be performed on the next second memory cell group.

On the other hand, in step S240, a program operation of bytes can be performed on the first memory cell group, and a count value is incremented by 1 in step S250. It is worth mentioning that, in one embodiment, the above count value can be cleared to 0 synchronously in step S230.

In step S260, the memory device can determine whether the count value is greater than the preset threshold value, and thereby determine whether the current memory cell group has been programmed times greater than the preset threshold value. In the embodiment, the preset threshold value can be any value arbitrarily set by the designer, such as equal to or greater than 3. The preset threshold value is used as the basis for determining whether the memory cells in the memory cell group have degraded, and the designer can determine the preset threshold value based on the actual measurement results of the memory device.

If the determination result in step S260 is "yes", it means that the memory cells in the memory cell group have degraded, and the memory device can set the indication flag equal to logic 1 in step S270. On the contrary, if the determination result in step S260 is "no", step S230 is re-executed to perform the verifying operation of the byte.

Herein, step S240 to step S260 can form a loop, and before the verifying operation of the byte is not completed, and the count value is not greater than the preset threshold value, the program and verifying operation of the memory cell group are repeatedly executed.

Continue to step S270, in step S280, the memory device can determine whether the count value is equal to the maximum programming time. If the count value is already equal to the maximum programming time, it means that the program operation failed (step S281); relatively, if the count value is not equal to the maximum programming time, return to step S230 and execute the next program and verifying operation.

In steps S2100 and S290, by increasing the address one by one, the memory device can perform the cycle of steps S230~S280 to perform program operation on each memory cell group in the memory division. And the indication flag is set to logic 1 according to whether there are degraded memory cells in the memory division.

In step S2110, memory device can determine whether the indication flag is logic 1. When the indication flag is not logic 1, it means that there are no degraded memory cells in the memory division, and no additional enhancement programming operation is needed, which means that the program operation of the memory division is completed (step S2111). In contrast, when the indication flag is logic 1, it means that there are degraded memory cells in the memory division, and the additional enhancement programming operation of step S2120 needs to be executed. In step S2120, memory device the memory device can adjust at least one of a plurality of program operation parameters in the program operation. For example, the program operation parameters include programmed verification voltage, voltage value of a programmed pulse, and a width of the programmed pulse. Among them, in step S2120, the memory device can increase at least one of the programmed verification voltage, voltage value of a programmed pulse, and the width of the programmed pulse to perform the enhancement programming operation on the memory cell group (for example, the first memory cell group).

Herein, the designer can choose the values of the programmed verification voltage, programmed pulse voltage, and programmed pulse width based on the memory device's application requirements and the chip's process parameters, without specific limitations on which to adjust and by how much.

In step S2120, the memory device can be synchronously initialized with the initial value for the address.

In step S2130, the memory device can perform the verifying operation of the byte, and execute step S2150 to increment the address after the verification is passed. If the verifying operation of the byte is failed, the memory device can execute step S2140 to continue the next enhancement programming operation for the memory cell group.

In step S2160, when the address is equal to the maximum value, it means that the enhancement programming operation of all memory cell groups is completed, and the program or operation of the memory division is also completed (step S2170). If the address is not equal to the maximum value, step S2130 may be re-executed to perform enhancement programming operation for the next memory cell group (second memory cell group).

It is worth noting that, in the embodiment, incrementing the count value and setting the indication flag of the step S250 are completed during the program operation of the memory cell group, and no additional operations are required. Moreover, through the setting operation of the indication flag, the memory device can adaptively start the enhancement programming operation to perform charge compensation for the memory cell group with degraded memory cells, effectively improving the reliability of the data.

Figure 3:
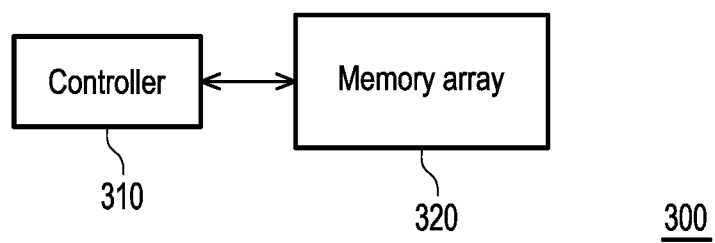
FIG. 3 is schematic diagram of a memory device according to an embodiment of the present invention.

Referring to FIG. 3 below, FIG. 3 is schematic diagram of a memory device according to an embodiment of the present invention. The memory device 300 includes a controller 310 and a memory array 320. The controller 310 and the memory array 320 are coupled to each other. The memory array 320 can be any form of non-volatile memory and may have multiple memory partitions, such as memory pages or memory blocks. The controller 310 is used to perform multiple steps in the embodiments of FIG. 1 and FIG. 2. Among them, the controller 310 can be a processor with computing capabilities. Alternatively, the controller 310 can be a digital circuit designed using hardware description language (HDL) or other digital circuit design methods known to those skilled in the art. The controller 310 can also be implemented as a hardware circuit using field programmable gate arrays (FPGAs), complex programmable logic devices (CPLDs), or application-specific integrated circuits (ASICs).

In summary, the memory device of the present invention determines whether memory cell degradation has occurred in a memory division during the program operation of the memory division by checking the programming time for completing the program operation for each memory cell group. When memory cell degradation is detected in the memory division, an enhancement programming operation is performed on the memory cell group to ensure the reliability of the memory data.

What is claimed is:

1. An enhance programming method, comprising:
    in a first programming phase, performing program and verifying operations on a plurality of memory cell groups of a memory division from an initial address to a maximum address, wherein each of the memory cell group corresponds to at least one byte;
    calculating a programming time for completing program operation of each of the memory cell groups during the first programming phase;
    setting an indication flag to logic 1 to indicate at least one of the memory cell groups has been degraded, during the first programming phase, when the programming time of any of the memory cell group is larger than a preset threshold value;
    after completing the first programming phase on the memory division, determining whether to start a second programming phase according to a state of the indication flag;
    when the indication flag is at logic 1, increasing at least one of a plurality of program operation parameters, and performing, during the second programming phase, an enhancement programming operation on the first memory cell groups of the memory division from the initial address to the maximum address; and
    when the indication flag is not at logic 1, finishing the program operation without performing the enhancement programming operation,
    wherein the preset threshold value is used as a basis for determining whether memory cells in each of the memory cell groups have degraded.

2. The enhance programming method according to claim 1, wherein the program operation parameters comprise programmed verification voltage, a voltage value of a programmed pulse, and a width of the programmed pulse.

3. The enhance programming method according to claim 1, wherein the step of performing program and verifying operations on the plurality of memory cell groups of the memory division comprises:
    setting an address equal to an initial value, and performing a first program and verifying operation on a first memory cell group according to the address equal to the initial value;
    incrementing the address after the first program and verifying operation of the first memory cell group is completed; and
    performing a second program and verifying operation is performed on a second memory cell group according to the incremented address.

4. The enhance programming method according to claim 3, wherein the preset threshold value is less than a maximum programming time.

5. The enhance programming method according to claim 1, wherein the step of the enhancement programming operation comprises:
    setting an address equal to an initial value, increasing at least one of the plurality of program operation parameters, and performing a first enhancement program and verifying operation on a first memory cell group according to the address equal to the initial value based on the program operation parameters;
    incrementing the address after the first enhancement program and verifying operation of the first memory cell group is completed; and
    performing a second enhancement program and verifying operation on a second memory cell group according to the incremented address.

6. The enhance programming method according to claim 1, wherein the at least one byte is 2 to the Nth power of bytes, and N is an integer not less than 0.

7. The enhance programming method according to claim 1, wherein the memory division is a memory page or a memory block.

8. A memory device, comprising:
    a memory array, having at least one memory division; and
    a controller, coupled to the at least one memory division, is configured to:
        in a first programming phase, performing program and verifying operations on a plurality of memory cell groups of a memory division from an initial address to a maximum address, wherein each of the memory cell group corresponds to at least one byte;
        calculating a programming time for completing program operation of each of the memory cell groups during the first programming phase;
        setting an indication flag to logic 1 to indicate at least one of the memory cell groups has been degraded, during the first programming phase, when the programming time of any of the memory cell group is larger than a preset threshold value;
        after completing the first programming phase on the memory division, determining whether to start a second programming phase according to a state of the indication flag;
        when the indication flag is at logic 1, increasing at least one of a plurality of program operation parameters, and performing, during the second programming phase, an enhancement programming operation on the memory cell groups of the memory division from the initial address to the maximum address, and when the indication flag is not at logic 1, finishing the program operation without performing the enhancement programming operation, wherein the preset threshold value is used as a basis for determining whether memory cells in each of the memory cell groups have degraded.

9. The memory device according to claim 8, wherein the program operation parameters comprise programmed verification voltage, a voltage value of a programmed pulse, and a width of the programmed pulse.

10. The memory device according to claim 8, wherein the controller is further configured to:

setting an address equal to an initial value, and performing a first program and verifying operation on a first memory cell group according to the address equal to the initial value;

incrementing the address after the first program and verifying operation of the first memory cell group is completed; and performing a second program and verifying operation is performed on a second memory cell group according to the incremented address.

11. The memory device according to claim 10, wherein the preset threshold value is less than a maximum programming time.

12. The memory device according to claim 8, wherein the controller is further configured to:

setting an address equal to an initial value, increasing at least one of the plurality of program operation parameters, and performing a first enhancement program and verifying operation on a first memory cell group according to the address equal to the initial value based on the program operation parameters;

incrementing the address after the first enhancement program and verifying operation of the first memory cell group is completed; and performing a second enhancement program and verifying operation on a second memory cell group according to the incremented address.

13. The memory device according to claim 8, wherein the at least one byte is 2 to the Nth power of bytes, and N is an integer not less than 0.

14. The memory device according to claim 8, wherein the memory division is a memory page or a memory block.

* * * * *